(12) United States Patent
Tozuka

(10) Patent No.: US 7,607,919 B2
(45) Date of Patent: Oct. 27, 2009

(54) MAGNETIC SUBSTANCE DISPLAY PANEL

(75) Inventor: Taro Tozuka, Hiratsuka (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 707 days.

(21) Appl. No.: 10/544,643

(22) PCT Filed: Feb. 5, 2004

(86) PCT No.: PCT/JP2004/001174

§ 371 (c)(1),
(2), (4) Date: Aug. 5, 2005

(87) PCT Pub. No.: WO2004/090625

PCT Pub. Date: Oct. 21, 2004

(65) Prior Publication Data

US 2006/0246413 A1 Nov. 2, 2006

(30) Foreign Application Priority Data

Feb. 6, 2003 (JP) .............................. 2003-030157

(51) Int. Cl.
 *B43L 1/00* (2006.01)
(52) U.S. Cl. .................................................... 434/409
(58) Field of Classification Search .................. 434/409
 See application file for complete search history.

(56) References Cited

U.S. PATENT DOCUMENTS 4,143,472 A * 3/1979 Murata et al. ............... 434/409
5,018,979 A   5/1991 Gilano et al.
5,295,837 A * 3/1994 Gilano et al. ............... 434/409
5,411,398 A * 5/1995 Nakanishi et al. ........... 434/409
6,007,734 A * 12/1999 Tazaki et al. .............. 252/62.54
6,585,523 B2 * 7/2003 Tokunaga et al. ........... 434/409

FOREIGN PATENT DOCUMENTS

| JP | 53-127032 | | 11/1978 |
| JP | 59-032796 | B2 | 8/1984 |
| JP | 61-179423 | A | 8/1986 |
| JP | 05-503888 | A | 6/1993 |
| JP | 2001-201772 | A | 7/2001 |
| JP | 2003221541 | * | 8/2003 |
| WO | WO 91/07287 | A1 | 5/1991 |

* cited by examiner

*Primary Examiner*—Kurt Fernstrom
(74) *Attorney, Agent, or Firm*—Foley & Lardner LLP

(57) ABSTRACT

A magnetic display panel that excels in display and erasure performance, being free from any change of writing and display performance even upon repetition of display and erasure and that facilitates inhibition of thixotropic property and specific gravity control for dispersion medium vs. magnetic display substance, etc., ensuring low toxicity and low pollution. In particular, a magnetic substance display panel comprising a dispersion with yield value composed mainly of a magnetic display substance, water and an aqueous thickener and a support holding the dispersion, characterized in that the aqueous thickener is at least one member selected from among a crosslinked acrylic acid copolymer, a crosslinked maleic anhydride copolymer, a thickening polysaccharide and a polyvinylalkylamide.

2 Claims, No Drawings

MAGNETIC SUBSTANCE DISPLAY PANEL

TECHNICAL FIELD

The present invention relates to a magnetic display panel which forms and eliminates an image by means of a magnet.

BACKGROUND ART

In some conventionally used magnetic display panels, a magnetic material (magnetic particle) of a fine particle is dispersed in a dispersion liquid, and a magnet is operated through one surface in which the above-mentioned magnetic particle is allowed to migrate so as to form an image on the magnetic display panel. When unnecessary, the magnet is operated from an opposite side so as to settle the above-mentioned magnetic particle and eliminate the image.

Further, a magnetic display panel which carries out display by reversing a display magnetic particle is proposed in Japanese Patent Publication No. S59-32796. This magnetic display panel employs a dispersion liquid in which a magnetic particle having a specific remnant magnetization moment and a specific coercive force is dispersed in a dispersion medium, and which has a specific yield value.

Furthermore, as described in Japanese Laid-open Patent No. 2001-201772, the present applicant previously proposed a magnetic material inverting display panel in which a liquid dispersion, having a yield value, whose principal components are a dispersion medium, a thickener, and magnetic display materials, in fine particle form, whose poles are differently colored, is supported by a supporting member, wherein a total area of magnetic S-pole surfaces or magnetic N-pole surfaces of the above-mentioned magnetic display materials in fine particle form is from 60 to 500% of a display screen area of the display panel. This magnetic material inverting display panel has a good contrast, provides clear display, and an outstanding effect. However, when the panel is placed vertically and display and elimination are repeated, there is a disadvantage that magnetic display materials settle and cohere gradually, and some panels may cause a poor inversion.

In order to avoid such a disadvantage as mentioned above, there are proposals to increase viscosity of the dispersion liquid and prevent the settlement. However, being left to stand for a long period of time, these tend to be too thixotropic, and there is a disadvantage that the yield value and the viscosity of the dispersion liquid after the period of time become higher than necessary.

Furthermore, most of the above-mentioned conventional magnetic display panels use an organic solvent as the dispersion medium. If the dispersion liquid leaks, a problem arises with influence upon a human body and ignition. Such a point is particularly considered as a problem with use of toys and general stationery. Further, it is also concerned about environmental pollution in a manufacturing process etc.

Some documents (for example, Japanese Laid-open Patent No. S53-127032, Japanese Patent Publication No. S59-32796) illustrate that water may be used for the dispersion medium. However, any one of them does not particularly indicate the problem as mentioned above, or offer a particular means for solving the problem, a combination of the thickener, etc., except for the illustration.

DISCLOSURE OF THE INVENTION

The present invention allows a magnet to carry out display and aims to provide a magnetic display panel which does not change in writing performance and displaying performance even if the display and elimination in the panel are repeated, and in which thixotropy is easily inhibited and specific gravities of the dispersion medium and the magnetic display material are easily controlled, as well as it is of low toxicity and low-pollution.

The present invention provides a magnetic display panel in which a magnetic display material is allowed to migrate and inverted so as to repeat display/elimination, thus solving the above-mentioned problems.

In other words, according to the present invention, the magnetic display panel is provided which is a magnetic display panel comprising a dispersion liquid and a supporting member for holding the above-mentioned dispersion liquid, wherein the above-mentioned dispersion liquid whose principal components are a magnetic display material in fine particle form, water as a dispersion medium, and a thickener for aqueous system, is a dispersion liquid having a yield value, and the above-mentioned thickener for aqueous system is made of one or more members selected from a cross-linking type acrylic acid copolymer, a cross-linking type maleic anhydride copolymer, a viscosity improving polysaccharide, and a polyvinyl alkyl amide.

Further, as a preferable embodiment of the above-mentioned magnetic display panel, a magnetic display panel is provided in which a specific gravity adjustment agent is blended with the above-mentioned dispersion liquid.

According to the magnetic display panel in accordance with the present invention as described above, since the liquid is aqueous, it is possible to solve the problems, such as toxicity in the event of leakage of the dispersion liquid, pollution occurred in a manufacturing process, etc., in the case of an organic-solvent, and further contribute to reduction of environmental loads at the time of discarding.

Further, since the dispersion liquid of the magnetic display panel in accordance with the present invention is arranged as aqueous system in which principal component is water, it is possible to provide various compositions of specific gravity adjustment agents, thus being easy to control specific gravities of the dispersion medium, the magnetic display material, etc. By inhibiting settlement of the magnetic display material by way of the specific gravity control, it is possible to reduce control burdens, such as thixotropy and a viscosity decreasing with increasing shear rate.

Furthermore, unlike conventional ones, the above-mentioned dispersion liquid does not have to take into much consideration inhibition of the thixotropy after being left to stand for a period of time, and does not excessively increase or decrease in viscosity or yield value in an initial state, thus providing a good initial state and the maximum thixotropic inhibition effect.

The dispersion liquid in which the magnetic display material is dispersed needs to have a specific yield value and viscosity. The yield value is a factor that shows an action which prevents the settlement, so that the magnetic display material in dispersion liquid is dispersed suitably and retained near a display screen. Further, when magnetism is applied, the viscosity is an important factor in order to control the magnetic material of only the portion to which the magnetism is applied.

Although the above-mentioned yield value and viscosity are much associated with a quality of material, a form, a size, etc. of the magnetic display material, it is possible to suitably design them as long as the above-mentioned action is effected.

If the yield value and the viscosity are out of a design concept, maintenance stability of the formed display or image degrades. When writing is carried out by means of a magnetic pen, surrounding magnetic materials gather. For this reason, distribution of the magnetic materials becomes irregular, and not only the neighboring colors that form the display or image but also their circumferential edges change, thus the display or image becomes faded as a whole, and its clearness degrades.

Therefore, a thickener is blended in order to provide the dispersion liquid with a specific yield value and viscosity.

In the present invention, since water is used as the dispersion medium, one or more thickeners for aqueous system are used which are selected from the cross-linking type acrylic acid copolymer, the cross-linking type maleic anhydride copolymer, the viscosity improving polysaccharide, and the polyvinyl alkyl amide. Compared with solvent type thickeners, thickeners for aqueous system are more abundant as the material, thus providing a wide selection range, which itself provides an advantage of causing the dispersion medium to be aqueous. It is more preferable to select the above-mentioned the thickeners preferable.

Among them, the viscosity improving polysaccharides, such as xanthan gum, wellan gum, succinoglycan, guar gum, locust bean gum, and derivatives thereof, are preferable.

However, when its display type is an inverted type, the viscosity improving polysaccharides suitably carry out the control of magnetic display material particles and the inversion control of the display materials, but it is somewhat difficult to adjust the inhibition effect of cohesion of these display material particles, thus it is necessary to use the viscosity improving polysaccharides carefully. This is because minute magnetic display material particles constitute minute magnets separately, the magnetism held by the particle itself becomes large and cohesion becomes strong.

On the other hand, when the display type is a migration type, the magnetism held by the magnetic particle itself is small, so that the cohesion among these magnetic particles is comparatively small, and it is easy to hold the magnetic display material particles on the display screen side.

Furthermore, by addition of the specific gravity adjustment agent, it is possible to further improve the settlement inhibition power, and to obtain more preferable combination.

Further, when the display type is the inverted type, conditions, such as the inversion control of the particles, the settlement prevention, are severe compared with other display types. However, if the cross-linking type acrylic acid copolymer and the cross-linking type maleic anhydride copolymer are used as the thickener, a physical-properties design can be carried out suitably.

However, when the supporting member is constituted by a polyhedron of a multi-cell structure by using plastics etc., a thickening effect by means of the cross-linking type acrylic acid copolymer or the cross-linking type maleic anhydride copolymer tends to be inhibited by an adhesive component. In consideration of this point, it is necessary to select an adhesive to be used.

In addition, the above-mentioned problem can be avoided by employing, as the supporting member, a structure where components, such as an adhesive which may affect the thickening effect of the dispersion liquid, are out of direct contact with the dispersion liquid. In particular, it is possible to solve the problem by way of encapsulating methods in which the structure of the supporting member is devised, such as a method of encapsulating the dispersion liquid within the supporting member of a microcapsule, a method of physically press-fitting a plastic multi-cell structure body.

Further, as for the thickener, the polyvinyl alkyl amide can be used suitably, because it also provides an outstanding performance similar to the above-mentioned cross-linking type acrylic acid copolymer and has resistance also to adhesives.

Within a range where a fundamental performance of the above-mentioned thickener for aqueous system is not substantially affected, other thickeners can be simultaneously used which are hydroxyethyl cellulose, alginic acid alkyl esters, methacrylic acid alkyl esters, glycomannan, agar, carrageenan, benzylidene sorbitol and benzylidene xylitol, or derivatives thereof, inorganic particulates, nonionic surfactants having an HLB value of 8-12, such as polyglycerine fatty acid ester, polyoxyethylene sorbitan fatty acid ester, polyethylene glycol fatty acid ester, polyoxyethylene ricinus, polyoxyethylene lanolin-lanolin alcoholic-beewax derivative, polyoxyethylene alkyl ether-polyoxypropylene alkyl ether, polyoxyethylene alkyl phenyl ether, polyethylene oxide, fatty acid amide, etc., and dialkyl sulfosuccinate or dialkenyl sulfosuccinate, etc.

The above-mentioned technical problem is solved by using a thickener for aqueous system as described above.

Furthermore, blending the specific gravity adjustment agent does not cause the magnetic display material to settle accidentally, when the display and elimination in the panel are repeated, thus maintaining the writing performance and displaying performance. Especially when the panel is left to stand for a long period of time, the physical properties of the enclosed liquid in the initial state and after being left to stand for the long period of time are not caused to change much, and it is possible to obtain the magnetic display panel which can inhibit thixotropy.

As the above-mentioned specific gravity adjustment agent, a water-soluble specific gravity adjustment agent is preferable.

A water-soluble substance exceeding a specific gravity of 1.0 g/cm$^3$ may be used, in a broad sense, as the above-mentioned water-soluble specific gravity adjustment agent. However, in order to raise the specific gravity more efficiently, those having a high specific gravity and solubility are preferable, such as a halogenation salt, a polyacid salt, etc.

As examples of the above-mentioned specific gravity adjustment agents there may be mentioned at least one or more members selected from molybdates and/or tungstates. In particular, they may be molybdates and tungstates, such as sodium modybdate, potassium molybdate, ammonium molybdate, sodium tungstate, potassium tungstate, ammonium tungstate, lithium tungstate, and magnesium tungstate, and corresponding polyacid salts including isopolyacid salts, heteropolyacid salts.

By polyacid we mean a multi-acid in which an oxoacid of metallic elements, such as molybdenum and tungsten is condensed and generated. A polyacid constituted by a single metal, in which anions to be condensed are of the same type is referred to as an isopolyacid. A polyacid in which two or more types of anions are condensed, is referred to as a heteropolyacid. In particular, as examples of isopolyacid salts, there may be mentioned meta-sodium molybdate, meta-potassium molybdate, meta-ammonium molybdate, para-sodium molybdate, para-potassium molybdate, para-ammonium molybdate, meta-sodium tungstate, meta-potassium tungstate, meta-ammonium tungstate, meta-barium tungstate, para-sodium tungstate, etc. As particular examples of heteropolyacid salts, there may be mentioned sodium molybdophosphate, sodium molybdosilicate, sodium tungstophosphate, sodium tungstosilicate, etc.

These specific gravity adjustment agents can be used independently or two or more of them can be mixed and used.

By blending the above-mentioned specific gravity adjustment agent, a specific gravity difference between the dispersion medium and the magnetic display material can be controlled, thus providing more preferable control of display and elimination.

Therefore, even when there is a possibility that the magnetic display material may settle over time, such as when the yield value is low due to the selection of a thickener, when the yield value is designed to be intentionally low, etc., it is possible to prevent the settlement by blending the above-mentioned specific gravity adjustment agent, and controlling the specific gravity.

Further, the above-mentioned specific gravity adjustment agent suitably causes influence of gravity to be the minimum, so that the magnetic force for migration control may sufficiently be the minimum, thus providing a wide range of selection of particles, writing magnets, elimination magnets, etc.

When the display type is the inverted type or an orientation type, the specific gravity is adjusted such that the magnetic display materials gather somewhat close to the surface. When it is the migration type, the specific gravity adjustment is carried out to be neutral.

Further, when water is used as a main solvent, as compared with the case where the organic solvent etc. is used as the dispersion medium, a surface tension difference between the magnetic display material and the supporting member becomes large, and a problem may arise in wettability. If this is the case, in order to improve the wettability between the magnetic display material and the supporting member, it is possible to blend surfactants, such as a fluorochemical surfactant, a nonionic surfactant, an anionic surfactant, a cationic surfactant, dimethyl polysiloxane, etc.

In particular, the wettability to the magnetic display material is an element affecting a dispersion state and stability of the magnetic display material, and the wettability to the supporting member may cause problems, such as the remaining air, so that the wettability requires careful adjustment.

Further, the problem can also be solved by causing the quality of material and structure of the magnetic display material to be high in wettability to water.

It is possible to add a water-soluble organic solvent and a pH adjustment agent, a preservative, a defoaming agent, etc. to the above-mentioned dispersion liquid, if needed.

A conventional general-purpose solvent compatible with water can be used as the above-mentioned water-soluble organic solvent. As particular examples of the solvents, there may be mentioned ethanol, propanol, butanol, glycerol, sorbitol, triethanolamine, diethanolamine, monoethanolamine, ethylene glycol, diethylene glycol, thiodiethylene glycol, hexylene glycol, 1,3-butane diol, neoprene glycol, polyethylene glycol, propylene glycol, butylene glycol, ethylene glycol monomethyl ether, ethylene glycol monoethyl ether, diethylene glycol monomethyl ether, diethylene glycol monoethyl ether, ethylene glycol monomethyl ether acetate, propylene glycol monomethyl ether, propylene glycol monoethyl ether, 2-pyrrolidone, N-methyl-2-pyrrolidone, etc.

Since these water-soluble organic solvents tend to have low surface tension as compared with water, they can also be blended in order to solve the above-mentioned problem in the sense of adjusting the surface tension. Further, these water-soluble organic solvents have an advantage that the effect of raising a boiling point of the dispersion medium can be expected simultaneously.

However, since the organic solvent has limits of selecting an adhesive which constitutes the supporting member, and a possibility of erosion against the magnetic display material, so that care is needed in the selection.

Further, since the principal component of the dispersion medium is changed from the conventional high-boiling-point organic solvent to water, it is concerned that the dispersion medium might evaporate over time. However, in order to prevent the evaporation, provision can be taken by adding the above-mentioned water-soluble organic solvent which raises the boiling point, by raising the gas barrier properties of the supporting member, etc.

As particular examples of the provisions, there may be mentioned a method of sealing the surface by way of a lamination process, a coating process, etc., by using resins of high vapor barrier properties, such as ethylene vinyl alcohol copolymer, polychlorinated vinylidene, polyacrylonitrile, polyvinyl alcohol, aromatic polyamide, etc., a method of using a functional lamination film made of polyester, etc., a method in which an airtight transparent material, such as glass etc., is applied or stacked to a required portion of the supporting member, and a method of preparing an inorganic or metal vapor deposition film, by way of silica vapor deposition, alumina vapor deposition, etc.

In order to obtain suitable gas barrier properties, it is preferable to select a material which has proper water vapor permeability, oxygen permeability, etc. at a temperature and humidity to be used.

Further, when a microcapsule is employed as the supporting member, evaporation of moisture can also be inhibited by way of a method in which the microcapsule is formed as a multiplex microcapsule provided with an evaporation prevention layer.

Further, as examples of the above-mentioned pH adjustment agents, there may be mentioned ammonia, inorganic salts, such as sodium carbonate, sodium phosphate, sodium hydroxide, and sodium acetate, and organic basic compounds, for example water-soluble amine compounds, such as triethanolamine, diethanolamine, etc.

Further, as examples of the above-mentioned preservatives, there may be mentioned carbolic acid, sodium salt of 1,2-benzisothiazoline-3-on, sodium-benzoate, sodium-dehydroacetate, potassium sorbate, propylparaben, 2,3,5,6-tetrachloro-4-(methyl sulfonyl) pyridine, etc.

BEST MODE FOR CARRYING OUT THE INVENTION

The magnetic display material used in accordance with the present invention can be suitably selected according to the control form (display type) of display/elimination.

When the display type is the migration type, as for the magnetic display material, oxide magnetic materials, such as black magnetite, $\gamma$-hematite, chromium dioxide, ferrite, etc., and metal magnetic materials of alloy types, including cobalt, nickel, etc., can be used in the form of powder or a flake. Further, it may be granulated and used in order to adjust its size, shape, etc.

The size of the above-mentioned magnetic display material can be employed according to its purpose, from fine flour to a large and rough particle, and those that are sphere-shaped, column-shaped, block-shaped, flake-shaped, etc., can be used.

However, if there is a deviation in the size of the magnetic display material, its migration also varies, so that it is preferable to make it uniform from a viewpoint of the clearness of display.

Further, the above-mentioned magnetic display material can be mixed with a coloring material, and the surface can be covered with various types of materials, thus it can also be used with a color tone different from its own color.

On the other hand, when the display type is the inverted type, the magnetic S-pole surface and magnetic N-pole surface of the magnetic display material may only be different in color, and its shape is not particularly limited. For example, a flat magnetic display material may be used whose both sides are differently colored.

More preferably the above-mentioned magnetic display material is in the form of fine particle differently colored from a viewpoint of image forming performance and clearness of the formed image when writing with a magnet pen, and is formed such that a thin layer body is cut out or pulverized in which coloring compositions of different colors are applied to or a coloring sheet is laminated to one side of a layer where magnetic particles are dispersed in a synthetic resin and/or a synthetic-rubber composition of a specific color.

According to research of the present inventor, the magnetic display material is inverted when magnetic force of an opposite pole is applied to it. While, the flat or flake-shaped magnetic display materials are preferable, because they are inverted, being shifted in the situation where they are overlapped. Thus, the image formation speed is high and it is unlikely that those that are not inverted and those that are inverted imperfectly are mixed, whereby a clear display image is formed.

As examples of the thickeners for aqueous system used in accordance with the present invention, there may be mentioned a cross-linking type acrylic acid copolymer, a cross-linking type maleic anhydride copolymer, a viscosity improving polysaccharide, and a polyvinyl alkyl amide.

As particular examples of them, there may be mentioned cross-linking type acrylic acid copolymers, such as HIVIS Wako 103 (available from Wako Pure Chemical Industries, Ltd.), HIVIS Wako 104 (available from the company), HIVIS Wako 105 (available from the company), Carbopol 941 (available from Nikko Chemicals, Co., Ltd.), Carbopol 1342 (available from the company), Carbopol Ultrez 21 (available from the company), Carbopol AQUA SF-1 (available from the company), RHEOGIC 835H (available from NIHON JUNYAKU CO., LTD.), PEMULEN TR-1 (available from Nikko Chemicals, Co., Ltd.), PEMULEN TR-2 (available from the company), etc., cross-linking type maleic anhydride copolymers, such as STABILEZE 06 (available from ISP Japan, Inc.), STABILEZE QM (available from the company), etc., viscosity improving polysaccharides, such as a succinoglycan (MEYPRO, available from Sansho Co., Ltd.), KELZAN (xanthan gum, available from the company), K1A96 (wellan gum, available from the company, MEYPRO-GUAR (guar gum, available from the company), GENUGUM (locust bean gum, available from the company), etc., polyvinyl alkyl amides, such as GX-205 (available from Showa Denko K.K.) and Noniolex (available from the company), etc., and those derivatives etc. can be used.

Especially when taking into consideration selection conditions of the adhesive, the specific gravity adjustment agent, etc., the viscosity improving polysaccharide and polyvinyl alkyl amide are preferable. When taking into consideration the cohesion inhibition effect of the magnetic display material particles etc., the cross-linking type acrylic acid copolymer, the cross-linking type maleic anhydride copolymer, and the polyvinyl alkyl amide are preferable. These can be independently used or mixed.

The means of holding the dispersion liquid of the above-mentioned magnetic display material is not particularly limited. A supporting member in which two sheets are spaced apart from each other and sealed at their circumferences, a supporting member in which honeycomb cells of a regular hexagon are provided between two substrates spaced apart from each other, a supporting member in which microcapsules are provided at a substrate, etc., are suitably used.

Hereafter, examples in accordance with the present invention will be described, but the present invention is not limited to the following examples.

EXAMPLE 1

To 99.60 parts by mass of ion exchange water as the dispersion medium, 0.10 parts by mass of a phosphate ester type surfactant (PLYSURF A208S: available from DAI-ICHI KOGYO SEIYAKU CO., LTD.), 0.10 parts by mass of a polyoxyethylene sorbitan ester (available from Kao Corporation: RHEODOL SUPER TWL120), 0.01 parts by mass of a silicon type defoaming-agent (available from Kao Corporation: ANTIFOAM E-20), and 0.04 parts by mass of triethanolamine as a pH adjustment agent were added to obtain a uniform solution.

Furthermore, 0.15 parts by mass of a polyvinyl acetamide (available from Showa Denko K.K.: GX-205) was added as a thickener, and stirred and dissolved (at 25 degrees C.), so that a plastic liquid having a yield value 0.81 N/m$^2$ and a viscosity of 154 mPa·s at 20 degrees C. was obtained.

The above-mentioned yield value was measured by using a stress control type rheometer (available from Carri-Med Ltd, United Kingdom: CSL-100). In the measurement, a cone plate of 4 cm·2-degree was used at 20 degrees C.

Further, the above-mentioned viscosity was measured by using an E type viscometer (available from Brookfield Engineering Laboratories, U.S.A. DV-2 type). In the measurement, at 20 degrees C., and after rotating the dispersion liquid for one minute at 100 rpm, by using a CP-42 cone spindle attached to the above-mentioned E type viscometer, following which it was rotated for 5 minutes at 10 rpm, and the measured values were employed.

The same applies to the following examples and comparative examples.

Next, the above-mentioned plastic liquid was blended and stirred with the flake-shaped magnetic display material differently colored in two colors, green/white, at a rate of 8 parts by mass of the magnetic display material to 100 parts by mass of the plastic liquid, so as to obtain a dispersion liquid in which the magnetic display materials were uniformly dispersed in the plastic liquid.

Subsequently, the above-mentioned dispersion liquid was filled in cells of a multi-cell structure of honeycomb cells which were adhered to one side of a polyester resin film having a thickness of 0.125 mm by using an adhesive, were of a regular hexagon having a cell size of 3.5 mm, had a height of 1.0 mm, and were made of vinyl chloride resin.

Then, an open end of the above-mentioned multi-cell structure was coated with a polyester resin film having a thickness of 0.05 mm by using an adhesive, and the dispersion liquid was enclosed in the cells so as to obtain a display panel.

A magnetic south pole (referred to as a magnetic S-pole) was brought into contact with one side of the above-mentioned panel, and the magnetic display materials differently colored in two colors in the honeycomb cell were shifted toward the surface side, so that part of particles were arranged to overlap and be aligned, so as to form a green display screen. With respect to the above-mentioned display screen, a writing operation was performed on the surface of the polyester resin film by means of a magnetic north pole (referred to as a magnetic N-pole), so that white and clear display was obtained only at the part along which the magnetic N-pole passed on the green display screen.

Next, when the magnetic S-pole was operated again so as to slide on a white display portion, the magnetic display materials directing their white sides towards the surface were inverted, and it was able to recover the green display screen.

The evaluation results of the above-mentioned display panel are shown in Table 1.

EXAMPLE 2

To 99.53 parts by mass of ion exchange water as the dispersion medium, 0.10 parts by mass of a phosphate ester type surfactant (available from DAI-ICHI KOGYO SEIYAKU CO., LTD.: PLYSURF A208S), 0.10 parts by mass of a polyoxyethylene sorbitan ester (available from Kao Corporation: RHEODOL SUPER TWL120), 0.01 parts by mass of the silicon type defoaming-agent (available from Kao Corporation: ANTIFOAM E-20), and 0.04 parts by mass of triethanolamine as the pH adjustment agent were added so as to be a uniform solution.

Further, 0.10 parts by mass of a cross-linking type acrylic acid copolymer (available from Wako Pure Chemical Industries, Ltd.: HIVIS Wako 105) was added as a thickener, and stirred and dissolved.

To the solution, 0.12 parts by mass of triethanolamine was added as a pH adjustment agent so as to obtain a plastic liquid having a yield value of 0.57 N/m$^2$ and a viscosity of 173 mPa·s at 20 degrees C.

Next, the flake-shaped magnetic display materials differently colored in two colors, green and white, was blended and stirred with the above-mentioned plastic liquid, at a rate of 8 parts by mass of the magnetic display materials to 100 parts by mass of the plastic liquid, so that a dispersion liquid in which the magnetic display materials were dispersed uniformly in the plastic liquid was obtained.

Subsequently, the above-mentioned dispersion liquid was filled in cells of the multi-cell structure of the honeycomb cells which were adhered to one side of the polyester resin film having a thickness of 0.125 mm by using the adhesive, were of a regular hexagon having a cell size of 3.5 mm, had a height of 1.0 mm, and were made of vinyl chloride resin.

Then, an open end of the multi-cell structure was press-fitted and coated with a polyester resin film having a thickness of 0.05 mm, and the dispersion liquid was enclosed in the cells so as to obtain a display panel.

And as with Example 1, writing and elimination were performed through a panel upper surface, providing good results.

The evaluation results of the above-mentioned display panel are shown in Table 1.

EXAMPLE 3

To 30.36 parts by mass of the ion exchange water as the dispersion medium, 1.26 parts by mass of the phosphate ester type surfactant (available from DAI-ICHI KOGYO SEIYAKU CO., LTD.: PLYSURF A208S), 0.25 parts by mass of 1,2-benzisothiazoline-3-on (available from Avecia KK: PROXEL XL-2) as an antimicrobial agent, and 1.14 parts by mass of triethanolamine as the pH adjustment agent were added then stirred and dissolved by means of a magnet stirrer. Subsequently 0.33 parts by mass of succinoglycan (available from Sansho Co., Ltd.: MEYPRO), a viscosity improving polysuccharide as the thickener was added then heated and stirred with a dispersion device so as to obtain a thickener paste.

Further, to 66.55 parts by mass of the ion exchange water as the dispersion medium, 0.10 parts by mass of a polyoxyethylene sorbitan ester (available from Kao Corporation: RHEODOL SUPER LW120), and 0.01 parts by mass of the silicon type defoaming-agent (available from Kao Corporation: ANTIFOAM E-20) were added so as to be a uniform solution.

To this, 33.34 parts by mass of the above-mentioned thickener paste were added, then stirred at ordinary temperature by means of the dispersion device, so as to obtain a plastic liquid having a yield value of 0.06 N/m$^2$ and a viscosity of 143 mPa·s at 20 degrees C.

Next, the flake-shaped magnetic display materials differently colored in two colors, green/white, were blended and stirred with the above-mentioned plastic liquid, at a rate of 8 parts by mass of the magnetic display materials to 100 parts by mass of the plastic liquid, so as to obtain a dispersion liquid where the magnetic display materials were uniformly dispersed in the plastic liquid.

Subsequently, the above-mentioned dispersion liquid was filled in cells of the multi-cell structure of the honeycomb cells which were adhered to one side of the polyester resin film having a thickness of 0.125 mm by using the adhesive, were of a regular hexagon having a cell size of 3.5 mm, had a height of 1.0 mm, and were made of vinyl chloride resin.

Then, an open end of the multi-cell structure was coated with the polyester resin film having a thickness of 0.05 mm by using the adhesive, and the dispersion liquid was enclosed in the cells so as to obtain a display panel.

And as with Example 1, when writing and elimination were performed through the panel upper surface, the obtained magnetic display panel could not fully inhibit the cohesion of magnetic material particles, and the writing performance and elimination performance tended to cause unclear display. Although the inferior performance was provided, it was on an acceptable level.

The evaluation results of the above-mentioned display panel are shown in Table 1.

EXAMPLE 4

By using the dispersion liquid prepared in Example 1, spherical capsules having an inner diameter of about 2 mm were prepared by way of an orifice method.

Using a 5% solution of sebacoyl chloride in toluene as a film forming agent for the above-mentioned capsule, the film forming agent solution was extruded from an outer nozzle of double nozzles provided concentrically, the above-mentioned dispersion liquid in which the magnetic display materials were dispersed was extruded from an inner nozzle, a pressure and a Velocity were controlled, and a form and a size of the capsule were arranged. The capsule extruded from the above-mentioned nozzles was dropped into a 10% aqueous solution of hexamethylene diamine, so as to be a polyamide capsule by way of interfacial polymerization. A particle size of the obtained capsule was about 2 mm.

The above-mentioned capsules were arranged without a gap on a tray made of vinyl chloride resin with a depth of 2 mm. After stacking a vinyl chloride resin film, a flange portion of the tray and the vinyl chloride resin film were heat sealed so as to obtain a display panel.

Writing and elimination were performed through the above-mentioned a panel upper surface, providing good results.

The evaluation results of the above-mentioned display panel are shown in Table 1.

EXAMPLE 5

To 18.02 parts by mass of the ion exchange water as the dispersion medium, 0.75 parts by mass of a phosphate ester type surfactant (available from DAI-ICHI KOGYO SEIYAKU CO., LTD.: PLYSURF A208S), 0.68 parts by mass of triethanolamine as the pH adjustment agent, and 0.15 parts by mass of 1,2-benzisothiazoline-3-on (available from Avecia KK: PROXEL XL-2) as the antimicrobial agent were added, then stirred and dissolved by means of the magnet stirrer. Subsequently, 0.20 parts by mass of succinoglycan (available from Sansho Co., Ltd.: MEYPRO), a viscosity improving polysaccharide as the thickener, was added, then heated and stirred with the dispersion device so as to obtain a thickener paste.

Further, to 78.14 parts by mass of the ion exchange water as the dispersion medium, 0.10 parts by mass of the polyoxyethylene sorbitan ester (available from Kao Corporation: RHEODOL SUPER LW120), and 0.01 parts by mass of the silicon type defoaming-agent (available from Kao Corporation: ANTIFOAM E-20) were added so as to be a uniform solution.

To this, 1.95 parts by mass of a white pigment dispersion (available from TOYO INK MFG. CO.,LTD.: EM-WHITE FX9048) as a colorant, and 19.80 parts by mass of the above-mentioned thickener paste were added and stirred at ordinary temperature by the dispersion device, so as to obtain a plastic liquid having a yield value of 0.06 N/m$^2$ and a viscosity of 76 mPa·s at 20 degrees C.

Next, ground granules (particle size of 10-150 μm) of a mixture of magnetite and epoxy resin (blended magnetite content: 80% by mass) were used as black magnetic display materials, blended and stirred with the plastic liquid at a rate of 11.94 parts by mass of the magnetic display material to 100 parts by mass of the plastic liquid, so as to obtain a dispersion liquid in which the magnetic display materials were uniformly dispersed.

Subsequently, the above-mentioned dispersion liquid was filled in cells of the multi-cell structure of the honeycomb cells which were adhered to one side of the polyester resin film having a thickness of 0.125 mm by using the adhesive, were of a regular hexagon having a cell size of 3.5 mm, had a height of 1.0 mm, and were made of vinyl chloride resin.

Then, an open end of the multi-cell structure was coated with the polyester resin film having a thickness of 0.05 mm by using the adhesive, and the dispersion liquid was enclosed in the cells so as to obtain a display panel.

After that, writing was performed through a panel upper surface, and elimination was carried out through the back, providing good results.

The evaluation results of the above-mentioned display panel are shown in Table 2.

EXAMPLE 6

To 78.14 parts by mass of the ion exchange water as the dispersion medium, 0.10 parts by mass of the polyoxyethylene sorbitan ester (available from Kao Corporation: RHEODOL SUPER LW120), 0.01 parts by mass of the silicon type defoaming-agent (available from Kao Corporation: ANTIFOAM E-20), and 108.51 parts by mass of meta-sodium tungstate as a specific gravity adjustment agent were added so as to be a uniform solution.

To this, 19.80 parts by mass of the thickener paste prepared in Example 5 were added and stirred at ordinary temperature by means of the dispersion device, so as to obtain a plastic liquid having a yield value of 0.06 N/m$^2$, a viscosity of 96 mPa·s at 20 degrees C., and a specific gravity of 1.80 g/cm$^3$.

Next, 1.95 parts by mass of the white pigment dispersing element (available from TOYO INK MFG. CO., LTD.: EM-WHITE FX9048) as the colorant, and 11.94 parts by mass of the magnetic display materials employed in Example 5 as the magnetic display materials were blended and stirred with the plastic liquid at the rate, so as to obtain a dispersion liquid in which the magnetic display materials were uniformly dispersed in the plastic liquid.

Subsequently, the above-mentioned dispersion liquid was filled in cells of the multi-cell structure of the honeycomb cells which were adhered to one side of the polyester resin film having a thickness of 0.125 mm by using the adhesive, were of a regular hexagon having a cell size of 3.5 mm, had a height of 1.0 mm, and were made of vinyl chloride resin.

Then, an open end of the multi-cell structure was coated with the polyester resin film having a thickness of 0.05 mm by using the adhesive, and the dispersion liquid was enclosed in the cells so as to obtain a display panel.

Writing was performed through the above-mentioned panel upper surface, and elimination was carried out through the back. Due to the effects of the specific gravity adjustment agent, it was able to control a specific gravity difference between the dispersion medium and the magnetic display material, thus controlling migration more preferably and providing good writing and elimination results.

The evaluation results of the above-mentioned display panel are shown in Table 2.

EXAMPLE 7

To 101.85 parts by mass of the ion exchange water as the dispersion medium, 0.10 parts by mass of the polyoxyethylene sorbitan ester (available from Kao Corporation: RHEODOL SUPER TWL120), and 0.01 parts by mass of the silicon type defoaming-agent (available from Kao Corporation: ANTIFOAM E-20) were added so as to be a uniform solution.

Next, 0.15 parts by mass of the cross-linking type maleic anhydride copolymer (available from ISP Japan, Inc.: STABILEZE 06) was added as the thickener, then stirred and dissolved at 80 degrees C.

To this, 0.27 parts by mass of triethanolamine was added as the pH adjustment agent, so as to obtain a plastic liquid having a yield value of 0.36 N/m$^2$ and a viscosity of 381 mPa·s at 20 degrees C.

Next, the flake-shaped magnetic display materials differently colored in two colors, green and white, were blended and stirred with the above-mentioned plastic liquid, at a rate of 8 parts by mass of the magnetic display materials to 100 parts by mass of the plastic liquid, so as to obtain a dispersion liquid in which the magnetic display materials were uniformly dispersed in the plastic liquid.

Subsequently, the above-mentioned dispersion liquid was filled in cells of the multi-cell structure of the honeycomb cells which were adhered to one side of the polyester resin film having a thickness of 0.125 mm by using the adhesive, were of a regular hexagon having a cell size of 3.5 mm, had a height of 1.0 mm, and were made of vinyl chloride resin.

Then, an open end of the multi-cell structure was press-fitted and coated with the polyester resin film having a thickness of 0.05 mm, and the dispersion liquid was enclosed in the cells so as to obtain a display panel.

And as with Example 1, writing and elimination were performed through a panel upper surface, providing good results.

The evaluation results of the above-mentioned display panel are shown in Table 2.

COMPARATIVE EXAMPLE 1

Except that a polyethylene oxide (available from Meisei Chemical Works Ltd.: Alkox E-240) as the thickener was used, as with Example 1, a composition of the plastic dispersion liquid as shown in Comparative Example 1 of Table 1 was prepared, providing a plastic liquid having a yield value of 0.00 N/m² and a viscosity of 175 mPa·s at 20 degrees C.

To 100 parts by mass of the above-mentioned plastic liquid, 8 parts by mass of the magnetic display materials prepared by way of the same method as that in Example 1 were added and stirred, so as to obtain a dispersion liquid.

Then, as with Example 1, a panel was formed so as to obtain a display panel.

As with Example 1, the above-mentioned display panel was brought into contact with the magnetic N-pole through the panel surface, the magnetic display materials were shifted to the display screen side. After arranging the white sides towards a face sheet side, written operation was carried out by bringing the magnetic S-pole into contact with a display screen board, however, writing and elimination were not performed well.

The evaluation results of the above-mentioned display panel are shown in Table 2.

This is because the polyethylene oxide used as the thickener is considered to be able to provide the dispersion medium with the magnetic display materials with a viscosity decreasing with increasing shear rate, but unable to provide a yield value. Even if the yield value is provided, it is considerably small, so that the magnetic display materials having a large specific gravity cannot be held in the liquid.

Examination Items and Evaluation

The followings are examination items and evaluation with respect to the magnetic display panels in respective Examples and Comparative Example as described above.

(1) Writing Performance

Visually observed a state of a written line when performing writing operation.

○ . . . Written portion was constant in width and displayed clearly.

Δ . . . A part of writing portion was displayed and blurred.

× . . . Writing was impossible.

(2) Elimination Performance

Visually observed a state of the writing line when performing elimination operation.

○ . . . Suitably eliminated.

Δ . . . Elimination was imperfect.

× . . . Not written originally. If written, there were many portions not eliminable.

TABLE 1

| (Parts by Mass) | Example 1 | Example 2 | Example 3 | Example 4 |
|---|---|---|---|---|
| Ion Exchange Water | 99.60 | 99.53 | 96.91 | 99.60 |
| Phosphate Ester Type Surfactant | 0.10 | 0.10 | 1.26 | 0.10 |
| Polyoxyethylene Sorbitan Ester | 0.10 | 0.10 | 0.10 | 0.10 |
| Silicon Type Defoaming Agent | 0.01 | 0.01 | 0.01 | 0.01 |
| pH Adjustment Agent | 0.04 | 0.16 | 1.14 | 0.04 |
| Antimicrobial Agent | — | — | 0.25 | — |
| White Pigment Dispersion | — | — | — | — |

TABLE 1-continued

| (Parts by Mass) | Example 1 | Example 2 | Example 3 | Example 4 |
|---|---|---|---|---|
| Thickener Polyvinyl Acetamide | 0.15 | — | — | 0.15 |
| Cross-Linking Type Acrylic Acid Copolymer | — | 0.10 | — | — |
| Cross-Linking Type Maleic Anhydride Copolymer | — | — | — | — |
| Viscosity Improving Polysaccharide | — | — | 0.33 | — |
| Polyethylene Oxide | — | — | — | — |
| Specific Gravity Adjustment Agent | — | — | — | — |
| Yield Value (N/m²) | 0.81 | 0.57 | 0.06 | 0.81 |
| Viscosity (Immediately After) (mPa·s)(20° C.) | 154 | 173 | 143 | 154 |
| Writing Performance | ○ | ○ | Δ | ○ |
| Elimination Performance | ○ | ○ | Δ | ○ |

TABLE 2

| (Parts by Mass) | Example 5 | Example 6 | Example 7 | Comparative Example 1 |
|---|---|---|---|---|
| Ion Exchange Water | 96.16 | 96.16 | 101.85 | 98.95 |
| Phosphate Ester Type Surfactant | 0.75 | 0.75 | — | 0.10 |
| Polyoxyethylene Sorbitan Ester | 0.10 | 0.10 | 0.10 | 0.10 |
| Silicon Type Defoaming Agent | 0.01 | 0.01 | 0.01 | 0.01 |
| pH Adjustment Agent | 0.68 | 0.68 | 0.27 | 0.04 |
| Antimicrobial Agent | 0.15 | 0.15 | — | — |
| White Pigment Dispersion | 1.95 | 1.95 | — | — |
| Thickener Polyvinyl Acetamide | — | — | — | — |
| Cross-Linking Type Acrylic Acid Copolymer | — | — | — | — |
| Cross-Linking Type Maleic Anhydride Copolymer | — | — | 0.15 | — |
| Viscosity Improving Polysaccharide | 0.20 | 0.20 | — | — |
| Polyethylene Oxide | — | — | — | 0.80 |
| Specific Gravity Adjustment Agent | — | 108.51 | — | — |
| Yield Value (N/m²) | 0.06 | 0.06 | 0.36 | 0.00 |
| Viscosity (Immediately After) (mPa·s)(20° C.) | 76 | 96 | 381 | 175 |
| Writing Performance | ○ | ○ | ○ | X |
| Elimination Performance | ○ | ○ | ○ | X |

In the present Examples, in order to perform evaluations in severer conditions, the magnetic display panel whose display types are the inverted type and the migration type has mainly been described, and those of other types, such as the orientation type, have not been described. However, the magnetic display panel in accordance with the present invention also provided good effects in other display types.

INDUSTRIAL APPLICABILITY

As described above, according to the present invention, display and elimination are good. Repetitions of display and elimination do not cause writing performance and displaying performance to change. It is easy to inhibit thixotropy and control specific gravities of the dispersion medium, the magnetic display materials, etc. Further, the magnetic display panel which is of low toxicity and low-pollution nature can be provided.

The invention claimed is:

1. A magnetic display panel comprising:

a dispersion liquid and a supporting member for holding said dispersion liquid, wherein said dispersion liquid is a dispersion liquid, having a yield value, whose principal components are magnetic display materials in fine particle form, water as a dispersion medium, and a thickener for an aqueous system, and wherein said thickener for an aqueous system comprises one or more members selected from the group consisting of a cross-linking type maleic anhydride copolymer and a polyvinyl alkyl amide.

2. A magnetic display panel as claimed in claim 1, wherein said dispersion liquid is blended with a specific gravity adjustment agent comprising a molybdate and/or a tungstate.

* * * * *